(12) United States Patent
Kikinis

(10) Patent No.: US 6,480,486 B2
(45) Date of Patent: *Nov. 12, 2002

(54) MICRO-LOCALIZED INTERNET SERVICE CENTER

(75) Inventor: Dan Kikinis, Saratoga, CA (US)

(73) Assignee: Lextron Systems, Inc., Saratoga, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/861,301

(22) Filed: May 21, 1997

(65) Prior Publication Data

US 2002/0075858 A1 Jun. 20, 2002

(51) Int. Cl.[7] .......................... H04L 12/66; H04L 12/28; H04Q 7/20
(52) U.S. Cl. ...................... 370/354; 370/389; 370/463; 455/433
(58) Field of Search ................................. 370/351–356, 370/359, 389, 401–402, 419–420, 463, 465–467; 379/207, 221; 705/77, 34, 40; 709/217–219, 229, 203, 227–228, 249; 455/433

(56) References Cited

U.S. PATENT DOCUMENTS 5,610,910 A * 3/1997 Focsaneanu et al. ........ 370/401
5,793,762 A * 8/1998 Penners et al. ............. 370/352

OTHER PUBLICATIONS

Perkins et al., "DHCP for Mobile Networking with TCP/IP", Computers and Communications, 1995. Proceedings., IEEE Symposium on, 1995, pp. 255–261.*

Perkins, "Mobile–IP, Ad–Hoc Networking, and Nomadicity", Compuet Software and Applications Conference, 1996. COMPSAC '96., Proceedings of 20th International, 1996, pp. 472–476.*

* cited by examiner

Primary Examiner—Wellington Chin
Assistant Examiner—Maikhanh Tran
(74) Attorney, Agent, or Firm—Donald R. Boys; Central Coast Patent Agency, Inc.

(57) ABSTRACT

An Internet access system to be used by organizations such as hotels and the like uses local service centers adapted by first modems to in-house telephone wiring at separate premises maintained by the sponsoring organization. The modem connecting the local service center to the in-house telephone wiring is assigned a specific extension number on the in-house telephone system. The service center connects calls at the first modem to a converter that is adapted to provide Internet access through a line interface unit (LIU) to the calls answered at the first modem. A user configures a dial-up profile on his/her computer, usually a portable computer, with the extension number of the first modem, and uses this profile when resident at the hotel or other sponsoring premise. The user then is connected to the Internet at a local connection without having to have the dial-up profile and possibly script files to gain access otherwise.

4 Claims, 1 Drawing Sheet

MICRO-LOCALIZED INTERNET SERVICE CENTER

FIELD OF THE INVENTION

Figure 1:
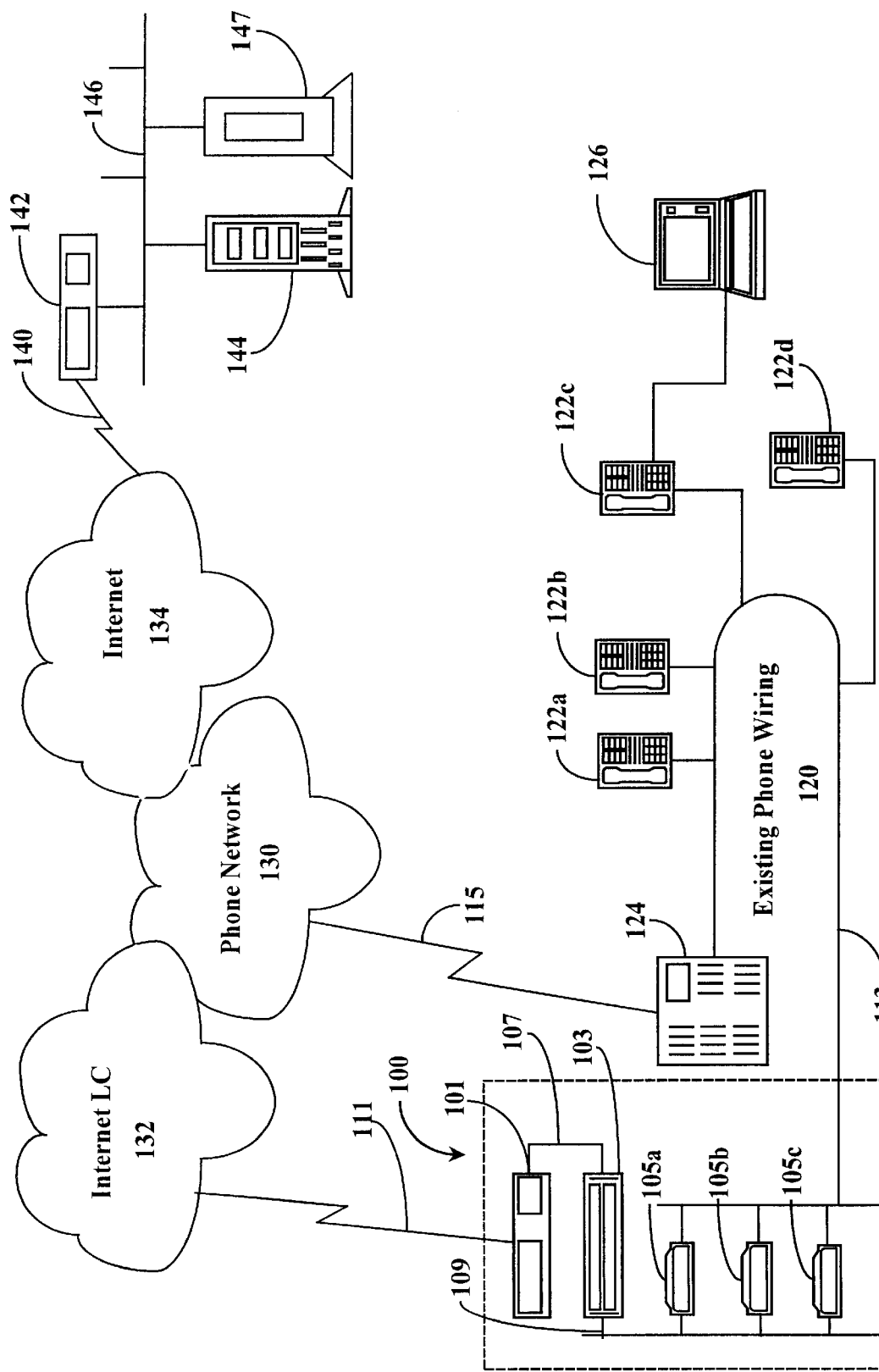

The present invention is in the field of telecommunications and has particular application to existing phone systems and wiring, as well as simplified software setup, for connecting and routing calls to the Internet.

BACKGROUND OF THE INVENTION

Executives who engage in business travel to a number of different countries often have the need to interface with their home offices or their home Internet Service Provider (ISP) at various times during their stay abroad. One increasing method of interface used by such executives is communication via the global network known as the Internet. Executives such as these often use laptop and notebook computers to communicate with their home offices and ISPs over the Internet.

While interactive communication is often preferred as a method for obtaining and distributing information, there are protocols and procedures related to logging on to the WWW that vary from country to country. Executives have to be trained to use and understand such protocol, and may have to use locally compliant applications such as script files to enable them to access the WWW in the particular part of the world from which they are operating.

One method or option of communication open to an executive in a remote country is simply to dial his home server number long distance, either an in-house network or a local ISP. This can be prohibitively expensive. Another option for the executive is to have an existing account with a local server in his home country that offers local coverage in the country he is operating from. While this method can be sufficient for some cases, often local carriers do not cover enough locations to eliminate constraints associated with long distance access fees. Particularly, in some countries domestic long-distance calls can be as expensive as international calls. Many countries require the use of script files, or a series of codes to log on to the WWW, generally requiring local access numbers and routing that may require fees, etc.

Infrastructure issues can add to problems. Many countries generally do not have the type of infrastructure that is conducive to clear communication over long distances. Even in the present age of digital lines, countries that are developing in, or aging in infrastructure may have poor-quality lines, connections, or switches resulting in a long distance Internet connection which is often plagued by noise, slow modem speeds, and interruptions.

What is clearly needed is a method and apparatus that allows business travelers to access home networks and ISPs while abroad, without requiring any significant change in procedure or identification.

SUMMARY OF THE INVENTION

In a preferred embodiment of the present invention an Internet-access service center comprising a first modem adapted to establish a link with a computer; a converter within the service center connected to the first modem and coupled to a database; and a line interface unit (LIU) connected to the converter and coupled to an outside telephone line. The converter is adapted to accept a call at the first modem, and to provide Internet access to the connection at the first modem through the LIU.

In some embodiments there may be multiple first modems adapted to answer one or more extension numbers on an internal telephone system, and the converter may provide script files or any other information and data required to make local Internet connection. The converter may also monitor and record customer transactions for such as billing purposes.

In one aspect of the invention Internet-access is provided, comprising two or more service centers each coupled to an in-house telephone system at separate locations; wherein each service center comprises a first modem adapted to establish a link with a computer, a converter within the service center connected to the first modem and coupled to a database; and a line interface unit (LIU) connected to the converter and coupled to an outside telephone line; and wherein the converter is adapted to accept a call at the first modem, and to provide Internet access to the connection at the first modem through the LIU. In these embodiments there may be multiple first modems adapted to answer one or more extension numbers on an internal telephone system, and the converter may be further adapted to monitor and record customer transactions.

In yet another aspect methods for practicing the invention are provided, such as a method for providing Internet access to a computer connected to an in-house telephone system, comprising steps of (a) connecting a service center by a first modem to the in-house telephone system, the modem assigned an extension number on the in-house telephone system; (b) connecting the computer through the first modem to a converter coupled to the first modem; and (c) dialing up a local Internet Service Provider by the converter via a line interface unit (LIU) to an outside line, thereby connecting the computer to the Internet.

BRIEF DESCRIPTION OF THE DRAWING FIGURES

FIG. 1 is an illustration of an Internet Service Provider (ISP) Service Center as used in an embodiment of the present invention

DESCRIPTION OF THE PREFERRED EMBODIMENTS

An object of the present invention is to provide method and apparatus enabling travelers to operate on the Internet with their portable computers without having to significantly alter their user identification, access codes, and the like, or any of the procedures to which they may have become accustomed. This object is met in embodiments of the present invention by Service Centers adapted to operate with customer premises telephone systems within local entities like hotels, airline lounges, and the like, where travelers may be for enough time to need access to their Internet resources. The Service Centers are adapted to provide seamless and transparent Internet access to such travelers.

In various embodiments of the present invention, travelers subscribe to an organization's unique Internet service as taught herein, and in subscribing typically provide to that organization some data allowing the organization to identify the subscriber for access and billing purposes. This data will typically be a subscriber's user ID and password, similarly as used for their primary Internet Service Provider. This information is added to a database accessible to Service Centers operated by that organization. In the present example the organization is an International hotel chain, having hotels in many countries where telephone system equipment and procedures and protocols for such as Internet access may vary widely.

FIG. 1 is an illustration of an Internet Telephony Service Center in an embodiment of the present Invention, showing a Service Center adapted to a hotel telephone system. The hotel may be located in any country in the world.

In the embodiment illustrated by FIG. 1, a traveler has connected a note-book computer 126 to an existing telephone 122c from a room or hotel lounge, etc. Phones 122a through 122d represent telephones connected on the hotel's internal telephone system, and may or may not have data ports installed to allow connection of a portable PC, such as note-book computer 126. If data ports are not present, the portable PC can be connected to the phone jack instead of the actual phone itself, or there may be a dual line in the connection allowing normal phone use and data connection simultaneously.

After connecting to the internal phone network, a link is established via existing in-house phone wiring 120 to an existing in house telephone switch 124. Switch 124 is connected to a local phone network 130 via telephony connection 115. Typically, in-house wiring 120 will be of the analog form, however, telephony connection 115 may be any type of line that is suitable and known in the art, and will, of course, vary in type according to the practices of the local country or jurisdiction.

In the event of normal phone use, local and long distance phone calls would proceed through switch 124 to local phone network 130 in a normal fashion. The traveler would place such calls according to instructions typically provided in the hotel room.

In the case of data connections to be made over unique local Service Center 100 by a subscriber to the service, the subscriber has been provided in a manner described more fully below with one or more special extension numbers to be used to access the service center. Calls to the reserved extension number or numbers are answered, in an embodiment of the present invention, by one of a series of modems 105a through 105c connected on in-house telephone wiring 120. Modems 105a through 105c are designed to answer incoming calls placed to such internal extension numbers, and to connect these calls via line 109 to an Internet Protocol (IP) converter 103, that has access to a data server containing data provided about subscribers to the service. This data server may be local to the hotel, or a server accessible on the Internet, such as server 147.

It will be apparent to one with skill in the art that any number of modems 105 may be designated for use in an embodiment of the present invention. The number of modems needed is determined by the size of the organization providing the ISP service, and the number of subscribers expected to be using the service. Also, depending on local rules and the switch used, highly integrated digital multi-line modems might be used, or any type of functional equivalent.

IP converter 103, with the aid of installed control code, has ability to associate information from data server 147 to individual incoming calls, and to remap data from an incoming call into data from the database to facilitate a connection for a subscriber. For example, IP converter 103 can recognize and associate information transmitted via note-book computer 126 with member-supplied information accessed from data server 147, such as, home-service access information, passwords, Internet addresses of company sites, etc.

To further illustrate by a specific example, a businessman from Tokyo, Japan seeks to connect, by his laptop computer, to his home ISP in Tokyo from a hotel in another country to download his e-mail for the day. In addition to providing data to the hotel server on subscribing, he has also been provided with configuration information for his portable computer. In some cases this configuration information may be provided in electronic form on a floppy disk, to allow automatic installation. The mechanism by which the user's portable computer is adapted to dial-up the hotel's service center is typically by providing the user's computer with an additional dial-up profile. This may be done by the user from information provided by the hotel or other organization in almost any form. For example, the hotel may provide the configuration information on a printed sheet, and the user may then create a new dial-up profile on his/her computer by techniques well-known in the art and supported by virtually all types of computers and operating systems. Alternatively the hotel or other organization may provide the profile on a floppy disk in a maimer that allows the user to install it on his/her computer. In any case, the profile will include the local extension number(s) assigned by the hotel for the internal modems (105, FIG. 1) connecting to the service center at a hotel providing the service. In most cases the hotel or other organization providing service centers can assign the same extension number(s) to be used at all locations providing the service, allowing for even greater simplicity. This is however not a prerequisite. IP converter 103 does the rest, making whatever substitutions and additions are necessary to complete a connection between laptop 126 (FIG. 1) through one of modems 105, via converter 103 and line interface unit (LIU) 101, which may be a modem or CSU/DSU as known in the art, and link 111, to the local country's Internet backbone 132. The hotel or other organization has an account with a local ISP provider, and connecting with the local ISP provider may involve use of a script file and so forth, but these operations will be transparent to the subscriber. From there, normal protocol and procedure connects the subscriber to his local ISP, e-mail server, or company network as the case may be.

In addition to the translations, additions, and so forth needed to connect the subscriber to the local ISP through the hotel Service Center, converter 103 may record transaction information related to subscriber use, such as time and length of connection, for billing purposes. In other embodiments such billing may be covered by subscriber fees determined in any of a number of ways not related to actual use of the service. Also possible, but not shown in FIG. 1, such billing data records might be automatically transmitted into the organization's billing systems, much like phone switches transmit records to hotel billing systems.

It will be apparent to one with skill in the art that such a unique service as herein described could be provided by any organization catering to travelers and having facilities in more than one country, such as hotels, airlines, resorts, fitness clubs, and the like, without departing from the spirit and scope of the present invention.

It will be apparent to one with skill in the art that there are many ways to add connections, as well as quantities of modems and phones as may be required to operate a system as described herein, without departing from the spirit and scope of the present invention. For example, in various embodiments there may be different numbers of telephones and in-house modems, and there are a number of ways the elements of Service Center 100 may be provided and connected. In still another embodiment, there may be a data server 147 located on each call premises with a separate Internet link to a central data base. Databases at such data servers may be updated regularly and may be connected to IP converter 103 via a separate link activated only when needed.

In another embodiment of the present invention data server 147 could be up-dated whenever a member registers at a hotel providing a Service Center according to an embodiment of the invention. Software could also be up-dated at hotel registration, if needed, so that when the member is ready to make a connection to the Internet, all current information would be available. Continual up-dates to software and features could be added to the system as it grows, i.e. signing on new members, call locations, and new countries where new hotels of the chain were built and subsequently added to the network.

It will be apparent to one with skill in the art that there are many different hardware and software configurations that can be employed in creating the functionality of the present invention without departing from the spirit and scope of the invention. For example, connections used to interface with the note-book computer may be altered to interface with various types of peripherals that may be used to access the Internet, including but not limited to WEB set top boxes, Internet telephones etc. Typical lines and connections used may be of any suitable type known in the art such as, analog or digital, etc. Software configurations relating to the unique embodiment of the relationship between the file server or servers, the IP converter or converters, and the user interface may function and be written in various ways without departing from the spirit and scope of the present invention Many other examples have already been described above.

What is claimed is:

1. An Internet-access subscription service center comprising:

a first network interface connected to an internal telephone wiring system for receiving data signals from a guest computer coupled to a particular extension wire set of the internal telephone wiring system;

an Internet Protocol (IP) converter within the service center connected to the first network interface and coupled to a database; and a second network interface connected to the IP converter and coupled to an outside local Internet connection;

wherein the IP converter accepts Internet access requests from the guest computer connected to the first network interface, records and verifies billing information and translates all networking parameters of said guest computer to allow it to connect to the local Internet connection through said second network interface.

2. The service center of claim 1 wherein the converter uses one or more script files in providing Internet access to the guest computer at the first network interface.

3. The service center of claim 1 wherein the converter monitors and records customer transactions.

4. A method for providing Internet access to a guest computer connected to an internal extension network at a hosting entity, comprising steps of:

(a) connecting a first network interface to an internal telephone wiring system of a hosting entity receiving data signals from a guest computer coupled to a particular extension wire set of the internal wiring system;

(b) connecting a converter to the first network interface and the first network interface is also coupled to a database; and (c) connecting a second network interface to the converter coupled to an outside Internet connection;

(d) receiving data signals from the guest computer connected to the first interface, and the converter translates all networking parameters of the guest computer to allow it to connect to the Internet through the second network interface;

(e) recording and verifying billing information for the guest computer via the database.

* * * * *